(12) United States Patent
Swint

(10) Patent No.: US 7,590,577 B1
(45) Date of Patent: Sep. 15, 2009

(54) NON-RECOURSE FUNDING OF SHARE REPURCHASES

(76) Inventor: Clifford C. Swint, 303 Charlton La., Neshanic Station, NJ (US) 08853

( * ) Notice: Subject to any disclaimer, the term of this patent is extended or adjusted under 35 U.S.C. 154(b) by 678 days.

(21) Appl. No.: 11/112,811

(22) Filed: Apr. 22, 2005

Related U.S. Application Data

(60) Provisional application No. 60/564,770, filed on Apr. 22, 2004, provisional application No. 60/569,152, filed on May 7, 2004.

(51) Int. Cl.
*G06Q 40/00* (2006.01)
(52) U.S. Cl. ......................................................... 705/35
(58) Field of Classification Search .................. 705/35, 705/37
See application file for complete search history.

(56) References Cited

U.S. PATENT DOCUMENTS

| | | | |
|---|---|---|---|
| 4,752,877 A | 6/1988 | Roberts et al. |
| 5,704,045 A | 12/1997 | King et al. |
| 5,742,775 A | 4/1998 | King |
| 5,802,499 A | 9/1998 | Sampson et al. |
| 5,987,435 A | 11/1999 | Weiss et al. |
| 6,016,482 A | 1/2000 | Molinari et al. |
| 6,148,293 A | 11/2000 | King |
| 6,304,858 B1 | 10/2001 | Mosler et al. |
| 6,321,212 B1 | 11/2001 | Lange |
| 6,347,307 B1 | 2/2002 | Sandhu et al. |
| 6,513,019 B2 | 1/2003 | Lewis |
| 6,766,303 B2 | 7/2004 | Marshall |
| 6,799,167 B1 | 9/2004 | Gullen |
| 6,839,686 B1 | 1/2005 | Galant |
| 7,249,077 B2 * | 7/2007 | Williams et al. ............... 705/35 |
| 2002/0065753 A1 | 5/2002 | Schloss et al. |
| 2002/0082852 A1 | 6/2002 | Greene et al. |
| 2002/0095361 A1 | 7/2002 | Trenk et al. |
| 2002/0107774 A1 | 8/2002 | Henninger et al. |
| 2002/0156709 A1 | 10/2002 | Andrus et al. |
| 2002/0184142 A1 | 12/2002 | Whang |
| 2003/0009409 A1 * | 1/2003 | Horner et al. ................. 705/36 |

(Continued)

OTHER PUBLICATIONS

A Contract for Difference, Anonymous, International Securities Finance pp. 43-45, Mar. 2003.*

(Continued)

*Primary Examiner*—Alexander Kalinowski
*Assistant Examiner*—Bruce I Ebersman
(74) *Attorney, Agent, or Firm*—Greeberg Traurig, LLP

(57) ABSTRACT

Various embodiments of the present invention relate to a method implemented by a programmed computer system for use in a financial transaction involving an entity which issues shares, an entity for providing funds and a counterparty, comprising: inputting data regarding a debenture between the entity which issues shares and the entity for providing funds, wherein the debenture provides funds to the entity which issues shares; inputting data regarding a purchase of shares by the entity which issues shares from the counterparty, wherein the counterparty borrows the purchased shares; paying for the purchase of shares, wherein the payment is made at least in part using at least a portion of the funds provided by the debenture; inputting data regarding a share purchase contract between the entity which issues shares and the counterparty; and inputting data regarding a total return swap of the debenture between the entity for providing funds and the counterparty.

12 Claims, 15 Drawing Sheets

U.S. PATENT DOCUMENTS

| | | |
|---|---|---|
| 2003/0088488 A1* | 5/2003 | Solomon et al. ............... 705/35 |
| 2003/0135436 A1 | 7/2003 | Birle, Jr. et al. |
| 2003/0163400 A1 | 8/2003 | Ross et al. |
| 2004/0030638 A1 | 2/2004 | Dwin |
| 2004/0039669 A1 | 2/2004 | Jones et al. |
| 2004/0039689 A1 | 2/2004 | Penney et al. |
| 2004/0117282 A1 | 6/2004 | Green et al. |
| 2004/0133494 A1 | 7/2004 | Jones et al. |
| 2004/0143525 A1 | 7/2004 | Nishimaki |
| 2004/0177016 A1 | 9/2004 | Jones et al. |
| 2004/0193521 A1 | 9/2004 | Smith et al. |
| 2004/0193536 A1 | 9/2004 | Marlowe-Noren |
| 2004/0215540 A1 | 10/2004 | Buxton |
| 2004/0215541 A1 | 10/2004 | Noraev et al. |
| 2004/0220866 A1 | 11/2004 | Marlowe-Noren |
| 2004/0243499 A1 | 12/2004 | Bateson et al. |
| 2004/0254869 A1 | 12/2004 | Hodes et al. |
| 2004/0260643 A1 | 12/2004 | Glicksman et al. |
| 2005/0004854 A1 | 1/2005 | Jones et al. |
| 2005/0021435 A1 | 1/2005 | Hakanoglu et al. |
| 2005/0055293 A1 | 3/2005 | Birle et al. |
| 2005/0075976 A1* | 4/2005 | Woodruff et al. ............. 705/40 |
| 2005/0086147 A1* | 4/2005 | Woodruff et al. ............. 705/36 |
| 2005/0114242 A1* | 5/2005 | Gray et al. .................... 705/35 |
| 2005/0197857 A1* | 9/2005 | Avery ........................... 705/1 |

OTHER PUBLICATIONS

You ain't seen nothin' yet, Mark Parsley, Euromoney Dec. 1997, n344, pp. 70-78.*

A mad rush for liquidity, Peter Lee, Euromonney n350, pp. 39-44, Jun. 1998, ISSN 0014-2433.*

* cited by examiner

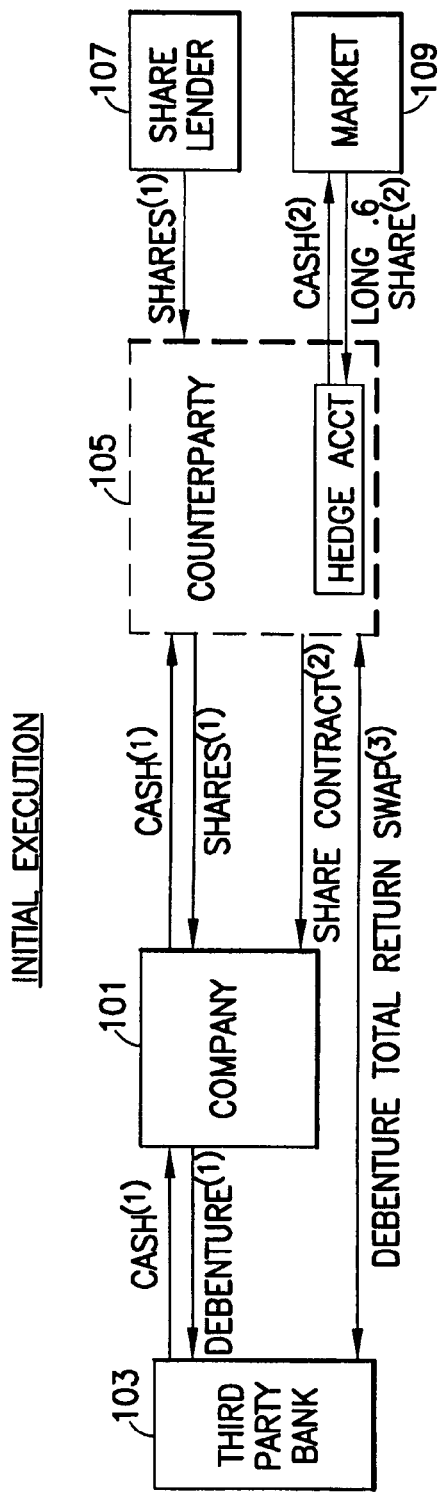

INITIAL EXECUTION

FIG.1A

1. COMPANY BORROWS CASH FROM THIRD PARTY BANK AND USES CASH TO PURCHASE SHARES FROM COUNTERPARTY (WHICH COUNTERPARTY HAS BORROWED).
2. COMPANY PURCHASES SHARE CONTRACT FROM COUNTERPARTY (COUNTERPARTY HEDGES AS IF IT SOLD A CALL OPTION OR CALL SPREAD).
3. THIRD PARTY BANK AND COUNTERPARTY ENTER INTO A TOTAL RETURN SWAP OF THE DEBENTURE (WHICH COULD BE PREPAID).

4. COMPANY PAYS DEBENTURE INTEREST TO THIRD PARTY BANK. IN SWAP, THIRD PARTY BANK PAYS DEBENTURE RETURN TO COUTERPARTY IN RETURN FOR LIBOR.
5. COMPANY PAYS PERIODIC PREMIUM THROUGHOUT THE TERM.
6. COUNTERPARTY EXECUTES NORMAL DELTA HEDGE ACTIVITY THROUGHOUT TERM.

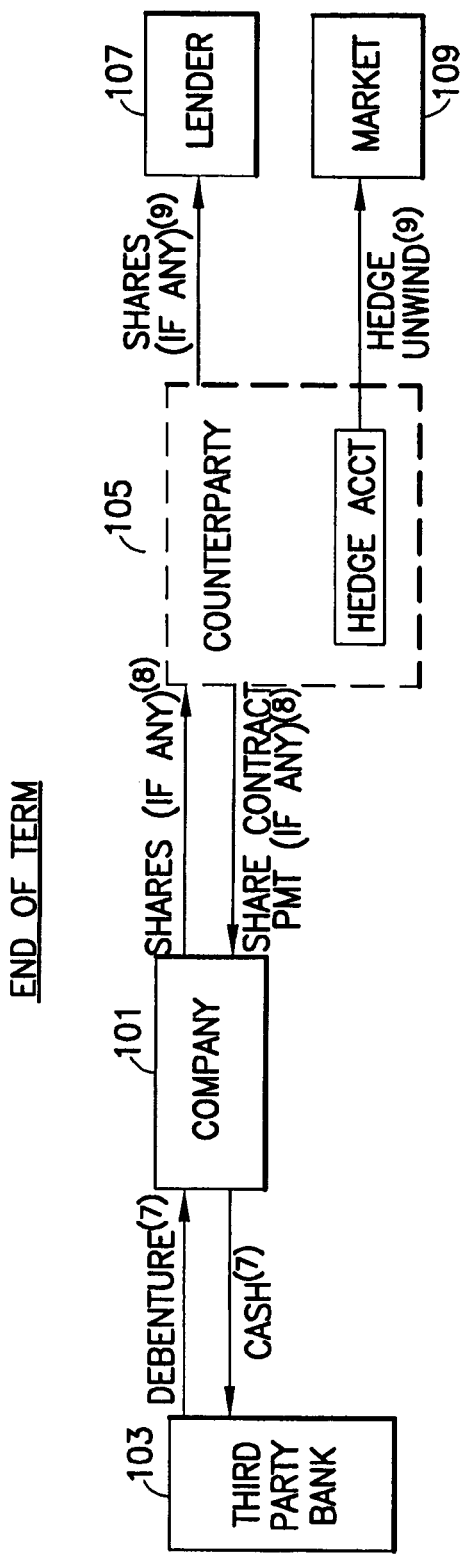

FIG.1C

7. COMPANY REPAYS DEBENTURE
8. COUNTERPARTY PURCHASES SHARES FROM COMPANY IN ACCORDANCE WITH THE TERMS OF THE SHARE CONTRACT AND THE MARKET PRICE AT MATURITY. SHARES DELIVERED PURSUANT TO AN EFFECTIVE REGISTRATION STATEMENT. COUNTERPARTY PAYS CONSIDERATION OF CASH AND/OR ANY COMPANY'S DEBENTURES (INCLUDING THE DEBENTURE). COUNTERPARTY AND/OR COMPANY CAN ALTERNATIVELY AGREE TO SETTLE ON A NET CASH BASIS.
9. COUNTERPARTY UNWINDS ITS HEDGE AND DELIVERS SHARES TO THE LENDER.

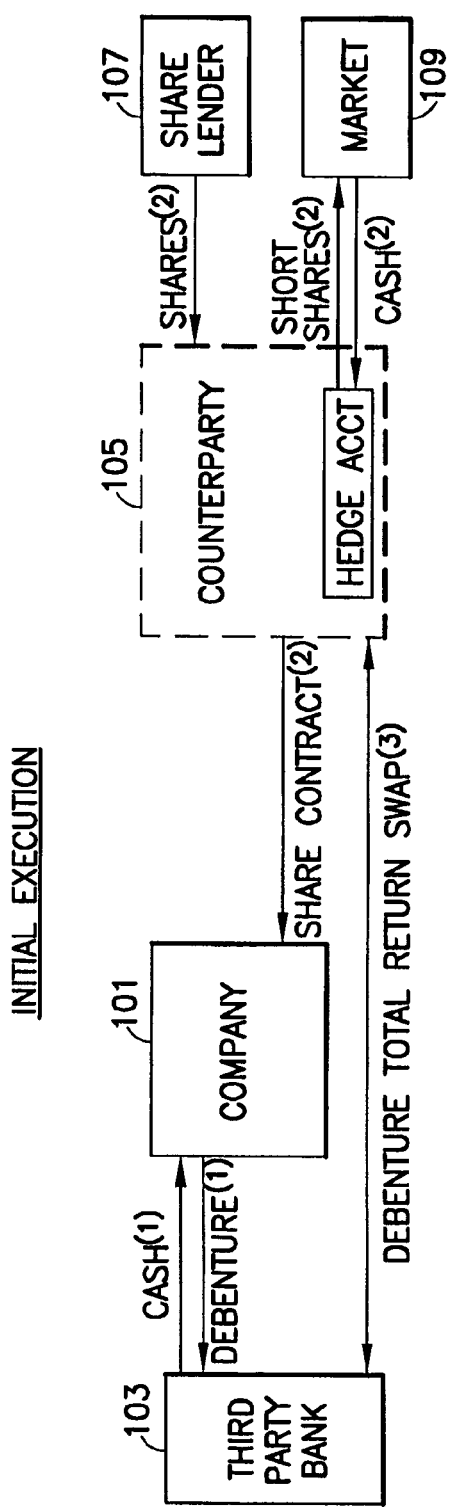

1. COMPANY BORROWS CASH FROM THIRD PARTY BANK THROUGH THE ISSUANCE OF A DEBENTURE AND USES CASH FOR ANY CORPORATE PURPOSE.
2. COMPANY PURCHASES SHARE CONTRACT FROM COUNTERPARTY (COUNTERPARTY HEDGES AS IF IT SOLD A PUT OPTION OR SOLD PUT AND PURCHASED CALL OPTION).
3. THIRD PARTY BANK AND COUNTERPARTY ENTER INTO A TOTAL RETURN SWAP OF THE DEBENTURE (WHICH COULD BE PREPAID).

FIG.5A

4. COMPANY PAYS DEBENTURE INTEREST TO THIRD PARTY BANK. IN SWAP, THIRD PARTY BANK PAYS DEBENTURE RETURN TO COUTERPARTY IN RETURN FOR LIBOR.
5. COMPANY PAYS PERIODIC PREMIUM THROUGHOUT THE TERM.
6. COUNTERPARTY EXECUTES NORMAL DELTA HEDGE ACTIVITY THROUGHOUT TERM.

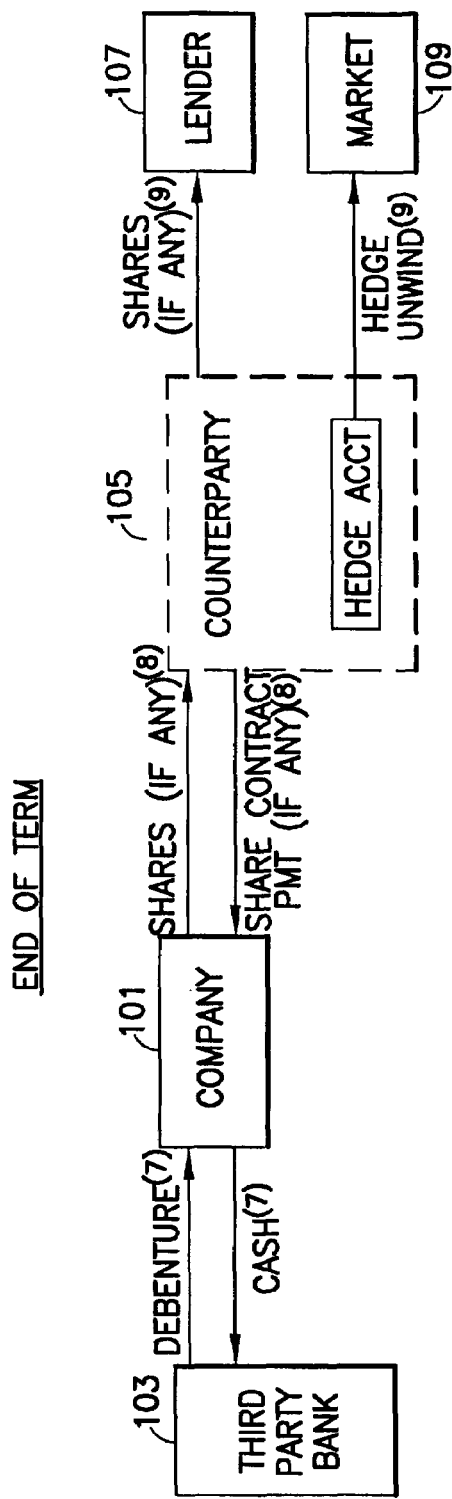

FIG.5C

7. COMPANY REPAYS DEBENTURE
8. COUNTERPARTY PURCHASES SHARES FROM COMPANY IN ACCORDANCE WITH THE TERMS OF THE SHARE CONTRACT AND THE MARKET PRICE AT MATURITY. SHARES DELIVERED PURSUANT TO AN EFFECTIVE REGISTRATION STATEMENT. COUNTERPARTY PAYS CONSIDERATION OF CASH AND/OR ANY COMPANY'S DEBENTURES (INCLUDING THE DEBENTURE). COUNTERPARTY AND/OR COMPANY CAN ALTERNATIVELY AGREE TO SETTLE ON A NET CASH BASIS.
9. COUNTERPARTY UNWINDS ITS HEDGE AND DELIVERS SHARES TO THE LENDER.

1. COMPANY BORROWS CASH FROM THIRD PARTY BANK AND USES CASH TO PURCHASE SHARES FROM COUNTERPARTY (WHICH COUNTERPARTY HAS BORROWED).
2. COMPANY PURCHASES PUT OPTION FROM COUNTERPARTY (COUNTERPARTY HEDGES AS IF IT SOLD A CALL OPTION).
3. THIRD PARTY BANK AND COUNTERPARTY ENTER INTO A TOTAL RETURN SWAP OF THE DEBENTURE (WHICH COULD BE PREPAID).

4. COMPANY PAYS DEBENTURE INTEREST TO THIRD PARTY BANK. IN SWAP, THIRD PARTY BANK PAYS DEBENTURE RETURN TO COUNTERPARTY IN RETURN FOR LIBOR.
5. COMPANY PAYS PERIODIC PREMIUM THROUGHOUT THE TERM.
6. COUNTERPARTY EXECUTES NORMAL DELTA HEDGE ACTIVITY THROUGHOUT TERM.

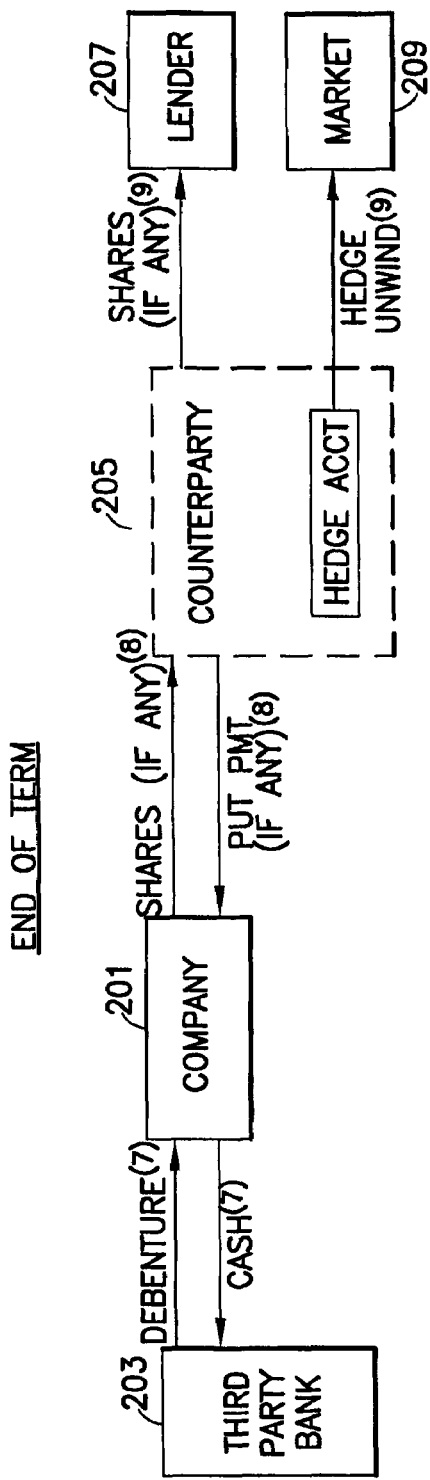

FIG.6C

7. COMPANY REPAYS DEBENTURE
8. IF SHARE PRICE IS ABOVE STRIKE, THEN PUT IS NOT EXERCISED. IF SHARE PRICE IS BELOW, THEN COMPANY DELIVERS SHARES TO COUNTERPARTY (PURSUANT TO AN EFFECTIVE REGISTRATION) AND COUNTERPARTY PAYS CONSIDERATION OF CASH AND/OR ANY COMPANY'S DEBENTURES (INCLUDING THE DEBENTURE).
9. COUNTERPARTY UNWINDS ITS HEDGE AND DELIVERS SHARES TO THE LENDER

US 7,590,577 B1

NON-RECOURSE FUNDING OF SHARE REPURCHASES

RELATED APPLICATIONS

This application claims the benefit of U.S. Provisional Application Ser. No. 60/564,770, filed Apr. 22, 2004 and U.S. Provisional Application Ser. No. 60/569,152, filed May 7, 2004.

FIELD OF THE INVENTION

Various embodiments of the present invention relate to a method implemented by a programmed computer system for use in a financial transaction involving an entity which issues shares, an entity for providing funds and a counterparty, comprising: inputting data regarding a debenture between the entity which issues shares and the entity for providing funds, wherein the debenture provides funds to the entity which issues shares; inputting data regarding a purchase of shares by the entity which issues shares from the counterparty, wherein the counterparty borrows the purchased shares; paying for the purchase of shares, wherein the payment is made at least in part using at least a portion of the funds provided by the debenture; inputting data regarding a share purchase contract between the entity which issues shares and the counterparty; and inputting data regarding a total return swap of the debenture between the entity for providing funds and the counterparty.

BACKGROUND OF THE INVENTION

Conventionally, a counterparty in a transaction of the type relating to the present invention would be unable to sell a share purchase contract to a company which would require the counterparty to hedge by shorting shares into the market (as would be the case with a share purchase contract having the economic substance of a put option) because such short sale activity would require a prospectus. An embodiment of the present invention solves this issue through a mechanism of selling borrowed shares to the company (this type of short sale is allowed because the short sale is to the company and not to the market) and then hedging its risk as if it sold a call option or call spread (which would require the counterparty to hedge by buying shares in the market which is an activity that does not require a prospectus (and not short selling in the market)).

Further, it is noted that tax regulations would typically prevent a company from deducting interest payments for debt that can be repaid in shares. Therefore, an embodiment of the present invention separates the share purchase contract from the debenture by having a third party (e.g., a bank) purchase the debenture. In order to swap the economics (credit spread) of the debenture back to the counterparty the invention may use a total return swap. The purchase contract may be structured to allow the counterparty the right to deliver to the company consideration to pay for the share purchase consisting of cash and/or the company's own debt securities. This feature may allow the counterparty to effectively offset its credit risk to the debenture (that it has through the swap) with the amount it would owe the company in a bankruptcy. As an example (which example is intended to be illustrative and not restrictive), if the company went bankrupt (and the debenture is defaulted) then the company's share price would go to zero and the counterparty would owe the company an amount which it could pay using the defaulted debenture as payment. Also, giving the choice of delivery of consideration in the share purchase contract may lower the price of the share purchase contract (which may be advantageous because payments of premium under the share purchase contract are believed to be not tax deductible and therefore the invention minimizes this inefficient portion of the transaction).

BRIEF DESCRIPTION OF THE DRAWINGS

FIGS. 1A-1C show a financing structure according to an embodiment of the present invention;

FIGS. 5A-5C show a financing structure (non-dilutive equity) according to an embodiment of the present invention;

FIGS. 6A-6C show another financing structure according to an embodiment of the present invention;

Among those benefits and improvements that have been disclosed, other objects and advantages of this invention will become apparent from the following description taken in conjunction with the accompanying figures. The figures constitute a part of this specification and include illustrative embodiments of the present invention and illustrate various objects and features thereof.

DETAILED DESCRIPTION OF THE INVENTION

Detailed embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

Figure 1B:
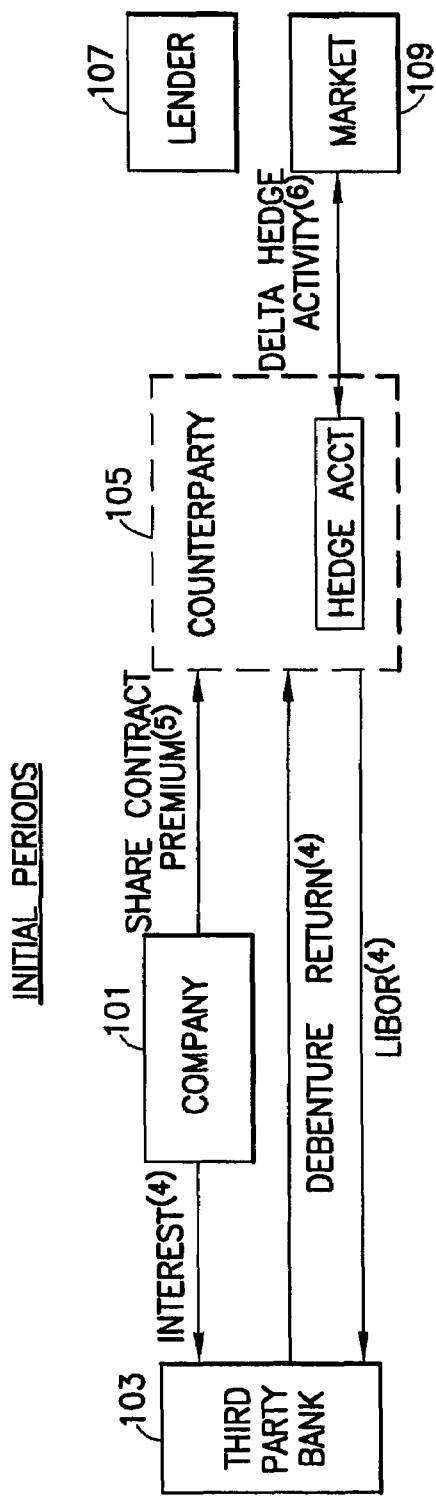

Referring now to FIGS. 1A-1C, an embodiment of the invention sometimes referred to hereinafter as "non-recourse funding of share repurchases" will be described (FIG. 1A refers to initial execution; FIG. 1B refers to interim period(s); and FIG. 1C refers to the end of the term).

More particularly, as seen in FIG. 1A, Company 101 borrows cash from Third Party Bank 103 and uses the cash to purchase shares from Counterparty 105 (Counterparty 105 may borrow the shares from Lender 107). Further, Company 101 purchases a share contract from Counterparty 105 (Counterparty 105 may hedge (e.g., in Market 109) as if Counterparty 105 had sold a call option or call spread). Further still, Third Party Bank 103 and Counterparty 105 enter into a total return swap of the debenture (which may be prepaid).

Moreover, as seen in FIG. 1B, Company 101 pays debenture interest to Third Party Bank 103. Further, in one example of the swap (which example is intended to be illustrative and not restrictive), Third Party Bank 103 pays debenture return to Counterparty 105 in return for LIBOR. Further still, Company 101 pays a periodic premium throughout the term. In addition, Counterparty 101 executes normal hedge delta activity throughout the term.

Moreover, as seen in FIG. 1C, Company 101 repays the debenture. Further, Counterparty 105 purchases shares from Company 101 in accordance with the terms of the share contract and the market price at maturity. In one example (which example is intended to be illustrative and not restrictive), shares may be delivered pursuant to an effective registration statement. In another example (which example is intended to be illustrative and not restrictive), Counterparty 105 pays consideration of cash and/or any debt of Company 101 (possibly including the debenture with Third Party Bank 103). In another example (which example is intended to be illustrative and not restrictive), Counterparty 105 and/or Company 101 may agree to settle on a net cash basis. Moreover, Counterparty 105 unwinds its hedge and delivers shares to Lender 107 (from which Counterparty 105 had borrowed shares).

Referring now to Tables 1A-1C, example Company and Third Party Bank economics relating to the non-recourse funding of share repurchases embodiment described above are shown (of course, the examples of these Tables 1A-1C are intended to be illustrative and not restrictive).

TABLE 1A (Pricing Parameters)

| | | | |
|---|---|---|---|
| Call Option Premium: | 27% | Debenture Rate: | 7.09% |
| Dividend Rate: | 0.99% | Put Option Rate: | 0.97% |
| Libor Rate: | 4.09% | Marginal Tax Rate: | 35% |

TABLE 1B (Company Cash Flow Analysis (assuming share price does not change))

| | PV | Total | 0 | 1 | 2 | 3 | 4 | 5 |
|---|---|---|---|---|---|---|---|---|
| Debenture Interest Payment | ($26.88) | ($35.45) | $0.00 | ($7.09) | ($7.09) | ($7.09) | ($7.09) | ($7.09) |
| Share Dividends Received | $ 3.75 | $ 4.95 | $0.00 | $0.99 | $0.99 | $0.99 | $0.99 | $0.99 |
| Contract Payment to CDC | ($ 3.66) | ($ 4.83) | $0.00 | ($0.97) | ($0.97) | ($0.97) | ($0.97) | ($0.97) |
| Receive Application from CDC | $ 0.00 | $ 0.00 | $0.00 | $0.00 | $0.00 | $0.00 | $0.00 | $0.00 |
| Tax | $ 9.41 | $12.41 | $0.00 | $2.48 | $2.48 | $2.48 | $2.48 | $2.48 |
| Total | ($20.36) | ($22.92) | $0.00 | ($4.58) | ($4.58) | ($4.58) | ($4.58) | ($4.58) |

TABLE 1C (Bank Cash Flow Analysis (assuming share price does not change))

| | PV | Total | 0 | 1 | 2 | 3 | 4 | 5 |
|---|---|---|---|---|---|---|---|---|
| Cost to Purchase Call Option | ($27.00) | ($27.00) | ($27.00) | ($7.09) | ($ 0.00) | $0.00 | $0.00 | $0.00 |
| Short Dividends | ($ 4.4 | $ 4.95 | $ 0.00 | $0.99 | ($ 0.99) | ($0.99) | ($0.99) | ($0.99) |
| Gross Net Swap (Debt Rate-Libor) | $13. | $15.00 | $ 0.00 | $3.00 | $ 3.00 | $3.00 | $3.00 | $3.00 |
| Contract Payment | $ 4.29 | $ 4.83 | $ 0.00 | $0.97 | $ 0.97 | $0.97 | $0.97 | $0.97 |
| Borrow Cost | ($ 1.11) | ($ 1.25) | $ 0.00 | ($0.25) | ($ 0.25) | ($0.25) | ($0.25) | ($0.25) |
| Gross Earnings on Short to Company | $18. | $20.45 | $ 0.00 | $4.09 | $ 4.09 | $4.09 | $4.09 | $4.09 |
| Credit Protection | ($ 0.37) | ($ 0.41) | $ 0.00 | ($0.14) | (0.11) | ($0.08) | ($0.05) | ($0.03) |
| Swap Cost | ($ 1.11) | $ 1.25 | $ 0.00 | ($0.25) | ($ 0.25) | ($0.25) | ($0.25) | ($0.25) |
| Total | $ 1.79 | $ 5.42 | $27.00 | $6.43 | $ 6.46 | $6.48 | $6.51 | $6.54 |

In another variation of the non-recourse funding of share repurchases embodiment described above, a collared purchase may be utilized. More particularly, in order to lower the cost of the structure, the share purchase contract may be structured in a way to cap the amount of potential appreciation the Company would receive from the purchased shares. In this regard, a collared transaction from the Company's point of view is similar to the Company buying an at the money call and then selling an out of the money call option simultaneously (for many companies, lowering the cap to 15% to 20% would result in a structure that has zero cost to the Company net of tax benefits—any cap would lower the net cost compared to no cap—as the cap is lowered below, for example, 15% to 20%, the structure may result in positive cash to the Company net of tax benefits whether or not the shares appreciate).

Reference will now be made to various illustrative Term Sheet examples relating to the non-recourse funding of share repurchases embodiment described above (of course, the examples of these Term Sheets are intended to be illustrative and not restrictive).

In any case, relating to the debenture, example terms may be as follows:

| | |
|---|---|
| Issuer: | ABC Company (the "Company"). |
| Issue: | Junior Subordinated Notes (the "Notes"). |
| Principal Amount: | Up to $200 million in aggregate. |
| Issue Price: | 100 |
| Maturity: | 5 Years. |
| Coupon: | 7.72% payable quarterly (300 bps over 5-year Libor). |
| Ratings: | Issue would not be rated. |
| Use of Proceeds: | Refinance existing debt, repurchase common shares and other general corporate matters. |
| Rank: | Junior Subordinated Unsecured. |
| Default: | Any default under any material term of the Notes including failure to pay principal and interest when due. |
| Placement Agents: | Debenture privately placed to one or more accredited financial or investor institutions. |
| Placement Fee: | 0.50%. |

Further, relating to the share purchase contract (non-capped), example terms may be as follows:

| | |
|---|---|
| Issuer: | ABC Company (the "Issuer" or "Company"). |
| Buyer: | Bank #1 (the "Buyer"). |
| Initial Shares: | 2.00 million shares of Company's common stock. |
| Initial Date: | Execution date of the Share Purchase Contract. |
| Initial Price: | Weighted average execution price of Buyer's hedge transactions in the market on or before the Initial Date as directed by Company. |
| Initial Value: | $200 million (assuming Initial Price of $100,000). |
| Maturity Date: | 5 Years. |
| Premium: | Buyer will pay quarterly premium at annual rate equal to 2.10% of the Initial Value. |
| Final Price: | Weighted average market price during the 10 trading days prior to the Maturity Date. |
| Shares to be Delivered: | If Final Price is less than or equal to Initial Price then Initial Shares. If Final Price is greater than Initial Price then: Initial Shares * Initial Price/Final Price. |
| Settlement: | On the Maturity Date or accelerated Maturity Date, Company shall deliver Shares to be Delivered that are freely and immediately tradeable in the public market in the hands of the Buyer and Buyer will pay Company an amount of Consideration equal to the Initial Value. Consideration shall be any combination (solely determined by Buyer) of cash or Company's debt securities and obligations (having a maturity date within 1 year of the Maturity Date) valued at its principal face amount (except in the case of zero coupon securities which would be valued based on accreted amount). In the event Company is unable to deliver Shares that are freely and immediately tradeable as described above, Buyer may in its sole discretion to settle the transaction by delivering an amount of Consideration net of the market value of the Share to be Delivered. |
| Dividends: | In the event of any change in Company's dividend rate, Premium shall be adjusted pursuant to a pre-determined formula designed to maintain the economic position of the parties immediately prior to such change. |
| Regulation Rights: | On or before 45 days after the Initial Date, Company shall file a prospectus to register the shares which shall become effective within 90 days after the Initial Date. Company will maintain effective registration until 30 days after the Maturity Date. In addition to other rights, the prospectus would provide for the Buyer to borrow shares from the Company from time to time during the term pursuant to a share lending agreement. Failure by the Company under this Registration Rights will result in a penalty equal to $X per business day. |
| Accelerated Maturity Date: | If Company's common shares are economically unborrowable in the securities lending market and the Buyer is unable to borrow shares from the Company then Buyer, with 3 business day prior written notice, can determine an Accelerated Maturity Date. If an Accelerated Maturity Date should occur: the Final Price would be the weighted average price which the Buyer has unwound his hedge in the market; and Company shall pay Buyer a cash penalty equal to $Y (pro-rated straight-line to Maturity Date). |
| Documentation: | ISDA. |

Further, relating to the share purchase contract (40% capped), example terms may be as follows:

| | |
|---|---|
| Issuer: | ABC Company (the "Issuer" or "Company"). |
| Buyer: | Bank #1 (the "Buyer"). |
| Initial Shares: | 2.00 million shares of Company's common stock. |
| Initial Date: | Execution date of the Share Purchase Contract. |
| Initial Price: | Weighted average execution price of Buyer's hedge transactions in the market on or before the Initial Date as directed by Company. |
| Initial Value: | $200 million (assuming Initial Price of $100,000). |
| Maturity Date: | 5 Years. |
| Premium: | Buyer will pay quarterly premium at annual rate equal to 2.10% of the Initial Value. |
| Final Price: | Weighted average market price during the 10 trading days prior to the Maturity Date. |
| Cap Price: | $140.00 |
| Shares to be Delivered: | If Final Price is less than or equal to Initial Price then Initial Shares. If Final Price is greater than Initial Price but less than Cap Price then: Initial Shares * Initial Price/Final Price. If Final Price is equal to or greater than Cap Price then: Initial Shares * [1-(Cap Price − Initial Price)/Final Price]. |
| Settlement: | On the Maturity Date or Accelerated Maturity Date, Company shall deliver Shares to be Delivered that are freely and immediately tradeable in the public market in the hands of the Buyer and Buyer will pay Company an amount of Consideration equal to the Initial Value. Consideration shall be any combination (solely determined by Buyer) of cash or Company's debt securities and obligations (having a maturity date within 1 year of the Maturity Date) valued at its principal face amount (except in the case of zero coupon securities which would be valued based on accreted amount). In the event Company is unable to deliver Shares that are freely and immediately tradeable as described above, Buyer may in its sole discretion to settle the transaction by delivering an amount of Consideration net of the market value of the Share to be Delivered. |
| Dividends: | In the event of any change in Company's dividend rate, Premium shall be adjusted pursuant to a pre-determined formula designed to maintain the economic position of the parties immediately prior to such change. |
| Registration Rights: | On or before 45 days after the Initial Date, Company shall file a prospectus to register the shares which shall become effective within 90 days after the Initial Date. Company will maintain effective registration until 30 days after the Maturity Date. In addition to other rights, the prospectus would provide for the Buyer to borrow shares from the Company from time to time during the term pursuant to a share lending agreement. Failure by the Company under this Registration Rights will result in a penalty equal to $X per business day. |
| Accelerated Maturity Date: | If Company's common shares are economically unborrowable in the securities lending market and the Buyer is unable to borrow shares from the Company then Buyer, with 3 business day prior written notice, can determine an Accelerated Maturity Date. If an Accelerated Maturity Date should occur: the Final Price would be the weighted average price which the Buyer has unwound his hedge in the market; and Company shall pay Buyer a cash penalty equal to $Y (pro-rated straight-line to Maturity Date). |
| Documentation: | ISDA. |

Further, relating to the initial purchase of shares, example terms may be as follows:

| | |
|---|---|
| Buyer: | ABC Company (the "Company"). |
| Broker: | Bank #1 (the "Broker"). |
| Shares: | 2.00 million shares of Company's common stock. |
| Price per Share: | Weighed average execution price of Bank #1's hedge transactions in the market on or before the Initial Date as directed by Company. |
| Commission: | $0.030 per Share. |
| Documentation: | Ordinary brokerage account. |

Further, relating to the total return swap, example terms may be as follows:

| | |
|---|---|
| Fixed Payer: | Bank #2. |
| Floating Payer: | Bank #1. |
| Underlying Asset: | 7.72% Junior Subordinated Notes issued by ABC Company. |
| Notional Amount: | $200 million principal amount of the Underlying Asset. |
| Rate: | 3-Month Libor + Z bps paid quarterly by Bank #1 to Bank #2. |
| Maturity Date: | 5 years. |
| Early Termination: | Bank #1 can elect early termination at anytime without penalty with 2 business days prior notice. |
| Fixed Amount: | Total Return of the Underlying Asset. |
| Pledge: | Bank #2 shall pledge the Underlying Asset to Bank #1. |
| Documentation: | ISDA |

Reference will now be made to viewing the non-recourse funding of share repurchases embodiment as, effectively, a term share repurchase funding structure where the principal obligation decreases with any decrease in the value of the purchased shares.

In this regard, various example benefits which may be obtained in connection with the non-recourse funding of share repurchases embodiment are described below in Table 2 (of course, these examples are intended to be illustrative and not restrictive—further, not all of the benefits may be available under all circumstances).

TABLE 2

(Embodiment of Present Invention vs. Conventional Share Repurchase)

| | Embodiment of Invention | Conventional Share Repurchase | With Embodiment of Invention, Company benefits by: |
|---|---|---|---|
| Share Repurchase | X | X | funding purchase of shares thereby essentially immediately reducing share count and gaining any potential price appreciation. |
| Share Price Downside | X | — | avoiding essentially 100% of risk of any potential price depreciation in the repurchased shares over the funding term. |
| Hedge Mismatch | X | — | eliminating mismatch which normally occurs when repurchasing shares to hedge employee options. |
| Liquidity Resources | X | — | minimizing usage of existing liquidity resources to fund repurchases through the use of this dedicated new source. |
| Ratings/ Lender | X | — | minimizing ratings/lender pressure which normally occurs when increasing funded debt to reduce equity. |
| Regulatory Capital | X | — | maximizing regulatory capital treatment for banks, broker/dealers and related holding companies. |
| Economic Cost | X | — | reducing all-in economic cost borne by company to carry repurchased shares on its balance sheet |
| Investor Perception | X | — | improving investor perception of risk/cost of repurchases used to support/hedge equity-linked compensation programs |

Figure 2A:
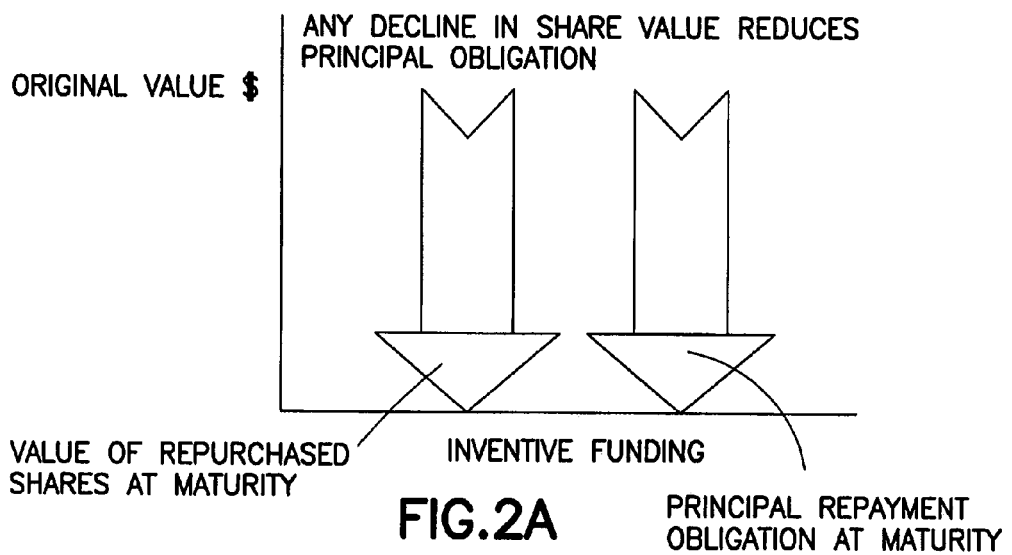
FIGS. 2A and 2B are diagrams relating to economic risk (or lack thereof) associated with repurchased shares (FIG. 2A relates to funding according to an embodiment of the present invention and FIG. 2B relates to conventional funding)
Figure 2B:
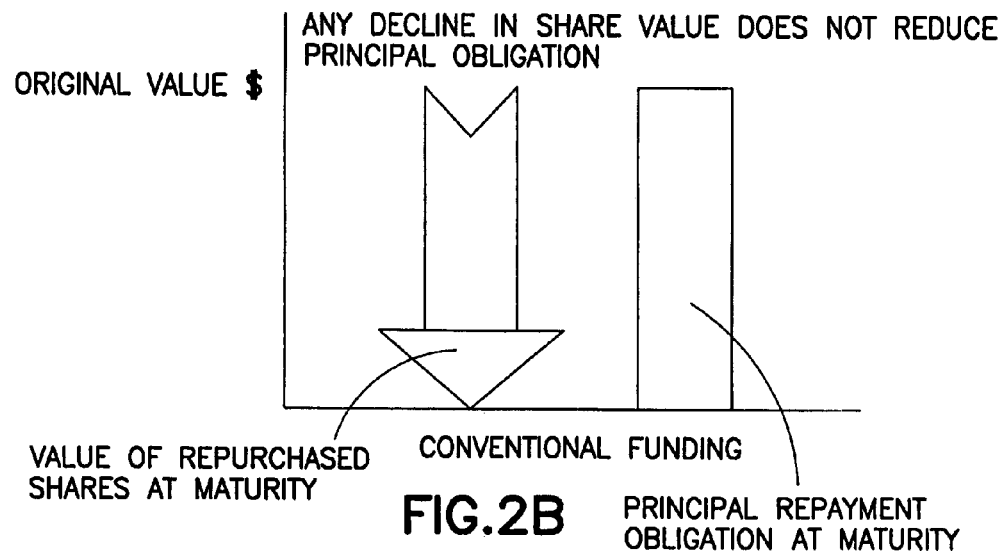

Further, with the non-recourse funding of share repurchases embodiment, the economic risk of repurchased shares may be essentially eliminated (see FIG. 2A contrasted with FIG. 2B). In this regard it is noted (in connection with example reasons for using the present invention) that: (a) repurchase of shares is an investment (although it is the Company's own stock, the decision to repurchase shares should nonetheless still be analyzed as an investment); (b) economic loss is not reflected in net income (economic loss related to any share price decline is real and could lead to insolvency even if such loss is not recognized in the income statement); (c) economic loss not reflected in net income (if Company's business conditions deteriorate, liquidity to repay the borrowing related to the share purchase may be unavailable); and (d) prospect of such loss must be considered (therefore the question is not whether non-recourse funding is needed today, but whether such prudent and defensive funding could be needed tomorrow).

Figure 3A:
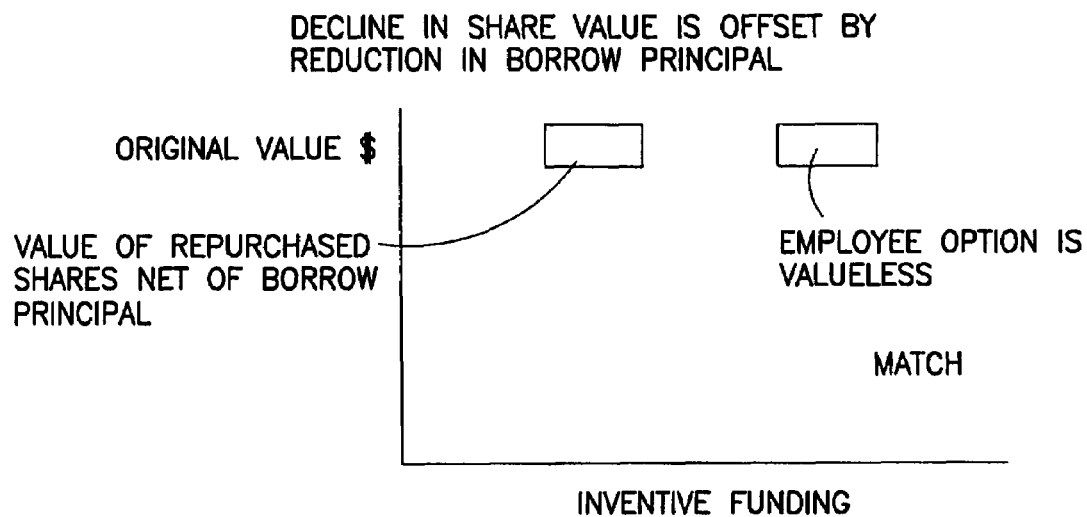
FIGS. 3A and 3B are diagrams relating to employee options (FIG. 3A relates to funding according to an embodiment of the present invention and FIG. 2B relates to conventional funding)
Figure 3B:
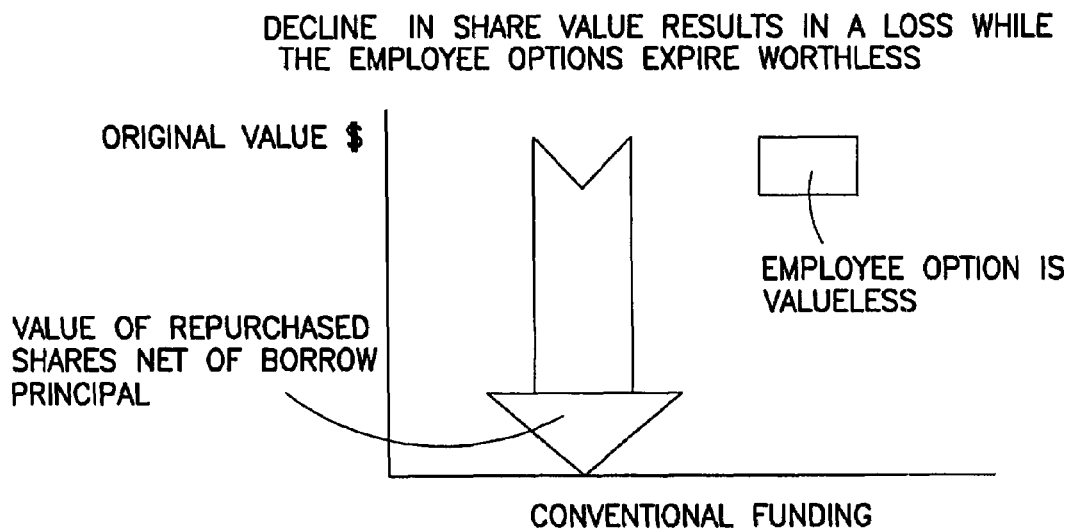

Further, with the non-recourse funding of share repurchases embodiment, the hedge mismatch may be essentially eliminated. In contrast, under conventional funding, shares repurchased to hedge the dilutive effects of employee options results in costly "hedge mismatch" if share price declines (see FIGS. 3A and 3B). In this regard it is noted (in connection with example reasons for using the present invention) that: (a) options are a significant driver of repurchases (a CSFB analyst estimates that 77% of repurchases were transacted to support employee stock option programs); (b) if share price rises hedge is effective (if share price rises then, under both conventional funding and the present embodiment, appreciation of repurchased shares would offset (i.e., hedge) the gain owed to the employee); and (c) if price declines hedge is ineffective (if share price declines then employee option would be worthless resulting in a hedge loss under a conventional funding (which would not occur under the present embodiment).

Further, with the non-recourse funding of share repurchases embodiment, the repurchased shares effectively become self-funding "financial assets". In this regard it is noted (in connection with example reasons for using the present invention) that: (a) repurchases absorb substantial liquidity (share repurchase programs often are the largest single use of a company's unsecured funding capacity reducing amounts available for other uses—because such acquired shares are illiquid, volatile and therefore have no lender "borrowing value", conventional repurchases reduce a key liquidity ratio (see Table 3, below)); (b) the present embodiment absorbs substantially less (the present embodiment does not reduce liquidity ratio (see Table 3, below) because shares would effectively have a "borrowing value" equal to the principal of the related debt)—in addition to turning repurchased shares into self-funding "assets", the present embodiment helps companies maintain high liquidity by: diversifying lending sources; eliminating rollover risk; conserving usage of existing unsecured credit capacity—in a prolonged "event driven liquidity crises" during which company is unable to issue new unsecured debt, the present embodiment can make a critical difference.

TABLE 3

(Comparison of a $10 Share Repurchase)
(ratio of liquidity source to debt)

|  | Prior | Conventional | Present Embodiment |
|---|---|---|---|
| Asset Borrowing Value: | $100 | $100 | $110 |
| Total Debt: | $100 | $110 | $110 |
| Liquidity Ratio: | 1.00 | 0.900 | 1.00 |

Further, with the non-recourse funding of share repurchases embodiment, there is less pressure on Company's ratings and lender relationships compared to conventional funding. In this regard it is noted (in connection with example reasons for using the present invention) that: (a) the present embodiment provides the ability to repay funding with shares (at maturity through a form of non-recourse mechanism, the principal can be repaid with a number of shares originally purchased); (b) the present embodiment may result in future equity infusion (the ability to issue shares at a fixed minimum price to repay the principal assures Company of a future equity infusion if it should need it); (c) the present embodiment may be "credited" by rating agencies (the rating agencies "factor in" such future equity infusion as "equity credit" when determining the current financial position of the Company; (d) the present embodiment may be credited by other lenders (lenders also generally recognize the benefits of the future equity infusion and will factor it into their covenant threshold formulas as well as other determinations of credit and credit capacity).

Further, with the non-recourse funding of share repurchases embodiment, a Company is provided with superior regulatory capital treatment. In this regard, it is noted (in connection with example reasons for using the present invention) that: (a) the present embodiment provides for consolidated supervisory entities (under the regulatory capital rules for consolidated supervisory entities of broker/dealers, it is believed that the present embodiment would meet the definition of a "Hybrid capital Instrument" and would therefore be eligible for superior treatment compared to other forms of debt); (b) the present embodiment provides for use with banks and other entities regulated by the Federal Reserve (it is believed that the present embodiment would be permitted for inclusion in Tier 2 capital by the Federal Reserve (as defined in 12 CFR 225, Appendix A)); and (c) the present embodiment provides a structural enhancement to further improve its regulatory treatment (the present embodiment could be structured as a zero coupon debenture where all or a significant amount of the interest payments are pre-paid).

Figure 4A:
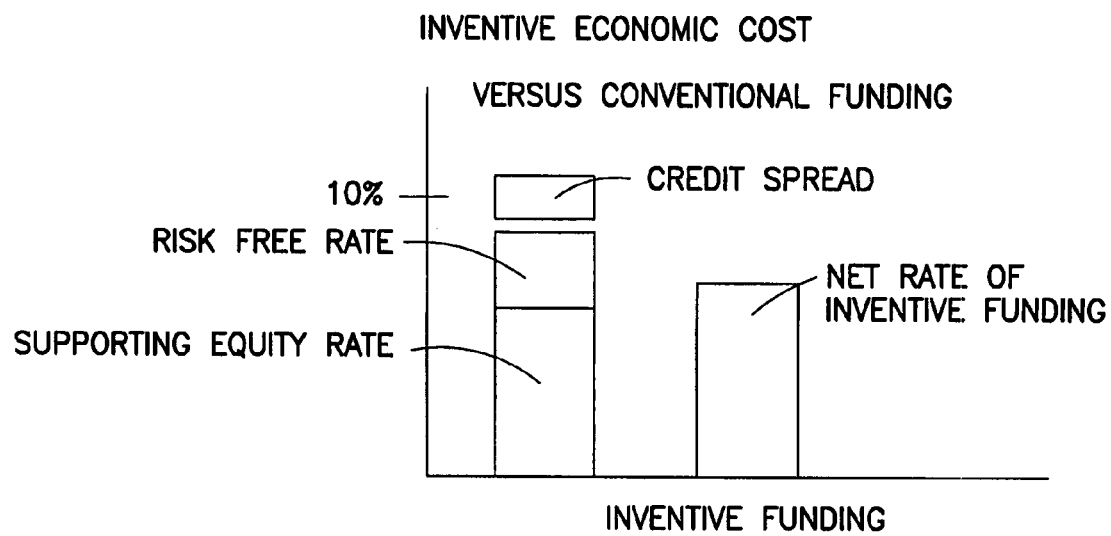
FIGS. 4A and 4B are diagrams relating to economic cost and accounting expense (FIG. 4A relates to economic cost according to an embodiment of the present invention and FIG. 4B relates to accounting expense according to an embodiment of the present invention)
Figure 4B:
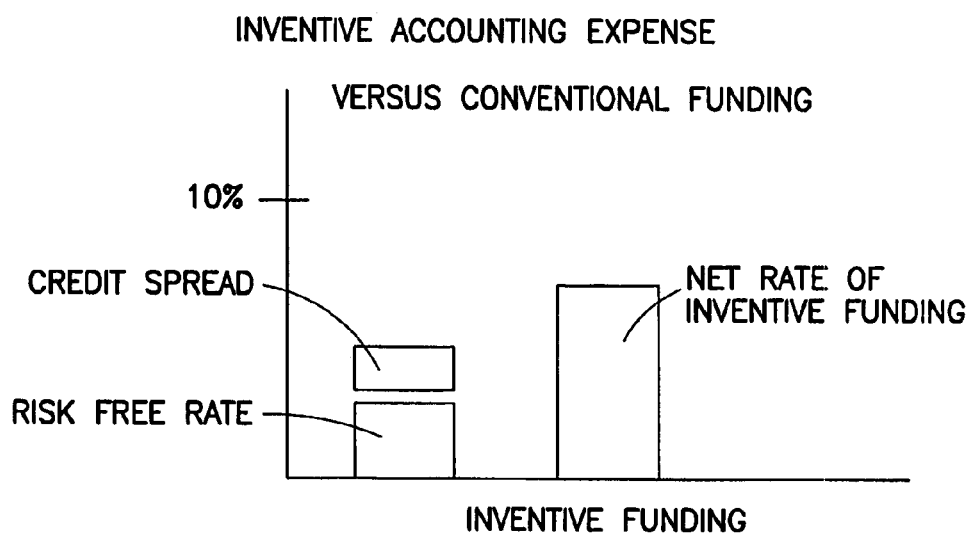

Further, with the non-recourse funding of share repurchases embodiment, the economic cost may be less although the accounting expense may be somewhat greater (see FIGS. 4A and 4B). In this regard, it is noted (in connection with example reasons for using the present invention) that: (a) conventional funding requires supporting equity (all-in economic cost of a conventional repurchase is equal to Company's average cost of capital (borrowing rate plus cost of supporting equity)); (b) the present embodiment does not require supporting equity (as (effectively) a non-recourse funding secured by company shares, the present embodiment (effectively) does not rely on any supporting equity capital—the rate associated with the present embodiment may be substantially less than Company's average cost of capital and therefore may be economically less costly than conventional funding); (c) economic cost may be less, expense may be greater (although economically less costly, more of the rate of the present embodiment may flow through the income statement as expense making it less accretive than conventional funding).

Further, with the non-recourse finding of share repurchases embodiment, investor perception may be improved (e.g., by prudently lowering the risk and cost of repurchases). In this regard it is noted (in connection with example reasons for using the present invention) that: (a) there may have conventionally been perception challenges (unexpected gross windfall—from option programs received by management simply because overall market is appreciating or company is sold; wealth transference—from ordinary shareholders to management from option programs causes their interests to differ instead of aligning; financial risk—of share repurchases to support option programs impairs company's ability to reinvest in its business, reduce debt or increase dividends); (b) new accounting rules may apply (in 2004, a total of $233 billion in stock repurchase programs were unveiled of which 77% may have been made to offset dilution from options exercises; new rules requiring disclosure of the cost of repurchases related to employee option programs challenge management to find new ways to lower risks); (c) funding according to the present embodiment may improve perception (the present embodiment may improve investor perception by: avoiding risk of any market price decline of repurchased shares; better matching dilution risk of employee options; minimizing usage of its current liquidity to purchase shares; minimizing negative lender/ratings impact of repurchase related borrowings; decrease risk-adjusted cost of funding repurchase over a given term).

Figure 5B:
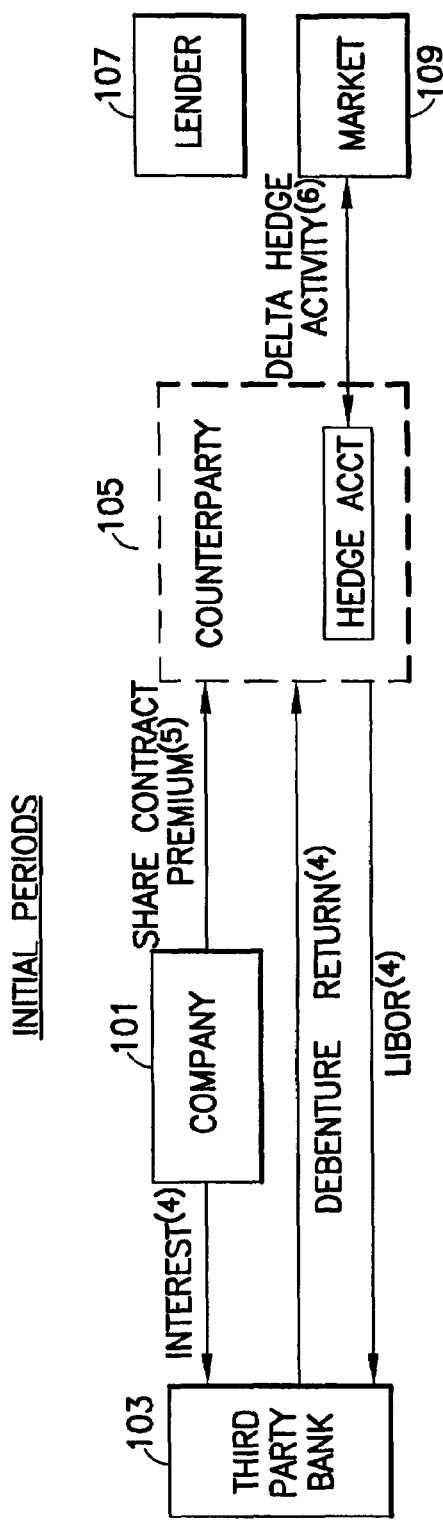

Referring now to FIGS. 5A-5C, a "non-dilutive equity" variation of the present embodiment will be described (FIG. 5A refers to initial execution; FIG. 5B refers to interim period(s); and FIG. 5C refers to the end of the term). In this regard, such a "non-dilutive equity" variation may provide a way for companies to receive equity capital that is non-dilutive from an EPS perspective, i.e., companies share count does not increase (this variation of the invention may be used by companies who need to raise equity like funding but do not want to increase their share count which would have the effect of decreasing their earnings per share and return on equity).

More particularly, as seen in FIG. 5A, Company 101 borrows cash from Third Party Bank 103 through the issuance of a debenture and uses the cash for any corporate purposes. Further, Company 101 purchases a share contract from Counterparty 105 (Counterparty 105 may borrow the shares from Lender 107 and may hedge (e.g., in Market 109) as if Counterparty 105 had sold a put option or sold put and purchased call option). Further still, Third Party Bank 103 and Counterparty 105 enter into a total return swap of the debenture (which may be prepaid).

Moreover, as seen in FIG. 5B, Company 101 pays debenture interest to Third Party Bank 103. Further, in one example of the swap (which example is intended to be illustrative and not restrictive), Third Party bank 103 pays debenture return to counterparty in return for LIBOR. Further still, Company 101 pays a periodic premium throughout the term. In addition, Counterparty 105 executes normal hedge delta activity throughout the term.

Moreover, as seen in FIG. 5C, Company 101 repays the debenture. Further, Counterparty 105 purchases shares from Company 101 in accordance with the terms of the share contract and the market price at maturity. In one example (which example is intended to be illustrative and not restrictive), shares may be delivered pursuant to an effective registration statement. In another example (which example is intended to be illustrative and not restrictive), Counterparty 105 pays consideration of cash and/or any debt of Company 101 (possibly including the debenture with Third party bank 103). In another example (which example is intended to be illustrative and not restrictive), Counterparty 105 and/or Company 101 may agree to settle on a net cash basis. Moreover, Counterparty 105 unwinds its hedge and delivers shares to Lender 107 (from which Counterparty 105 had borrowed shares).

Referring now (in connection with the "non-dilutive equity" variation of the present embodiment) to a subordinated debenture having minimal covenants and effectively secured, on a no-recourse basis, by a fixed number of common shares having an initial market value equal to the principal amount, it is noted that: (a) with regard to repayment—the payment risk at maturity is essentially eliminated through a feature which effectively allows conversion, at the issuer's option, of the debenture into common shares (based on the initial share price); (b) with regard to dilution—because the debenture has no upside conversion premium, there is no increase in share count regardless of the amount of share price appreciation over the term; (c) with regard to liquidity—the debenture helps liquidity by diversifying lending sources, reducing rollover risk, and conserving usage of existing credit capacity; (d) with regard to rating agency—because the increase in leverage is largely off-set by equity credit, the debenture significantly reduces negative ratings pressure compared to conventional funding; (e) with regard to cost—the debenture, which is a form of synthetic equity, costs significantly less than the cost of common equity; (f) with regard to execution—deeply subordinated debenture could be executed by one of several large money center banks partnered with one or more other entities and pursuant with a prospectus covering the initial sale of shares by such bank to hedge its risks.

Figure 6A:
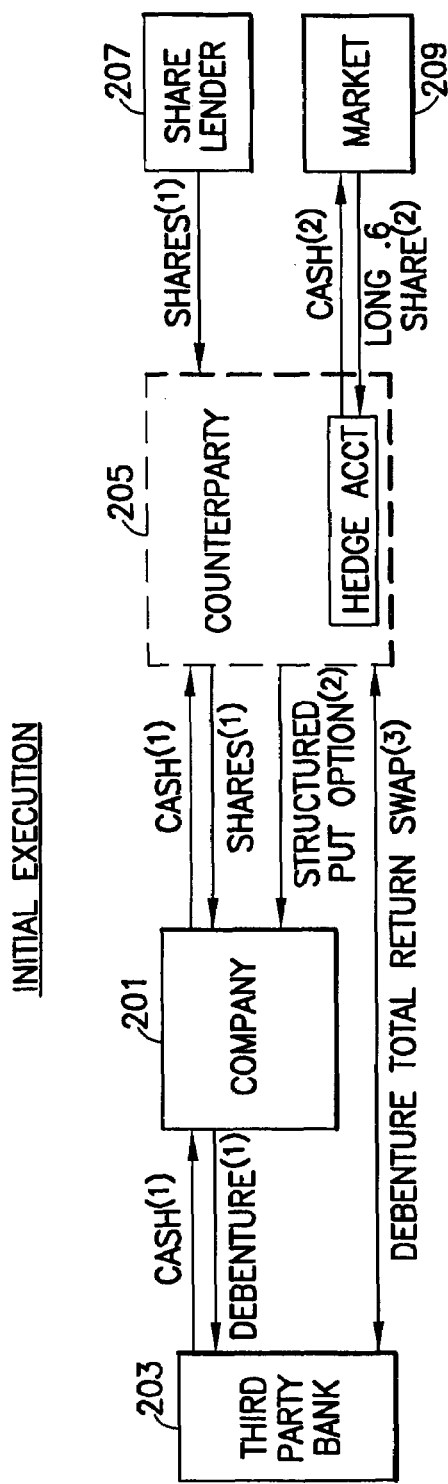
Figure 6B:
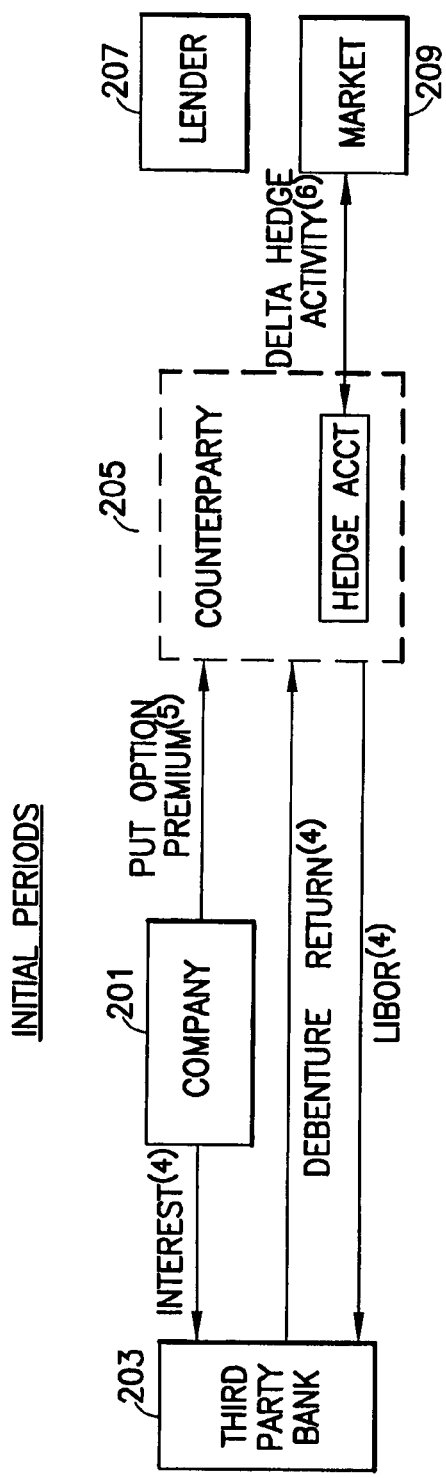

Referring now to FIGS. 6A-6C, an embodiment of the invention sometimes referred to hereinafter as "alternative method of repurchasing issuer shares," "method for hedging equity-linked compensation," and/or "employee option insurance" (or "EO insurance") will be described (FIG. 6A refers to initial execution; FIG. 6B refers to interim period(s); and FIG. 6C refers to the end of the term)

More particularly, as seen in FIG. 6A, Company 201 borrows cash from Third Party Bank 203 and uses cash to purchase shares from Counterparty 205 (Counterparty 205 may borrow the shares from Lender 207). Further, Company 201 purchases put option from Counterparty 205 (Counterparty 205 may hedge (e.g., in Market 209) as if Counterparty 205 sold a call option). Further still, Third Party Bank 203 and Counterparty 205 enter into a total return swap of the debenture (which may be prepaid).

Moreover, as seen in FIG. 6B, Company 201 pays debenture interest to Third Party Bank 203. Further, in one example of the swap (which example is intended to be illustrative and not restrictive), Third Party bank 203 pays debenture return to Counterparty 205 in return for LIBOR. Further still, Company 201 pays a periodic premium throughout the term. In addition, Counterparty 205 executes normal hedge delta activity throughout the term.

Moreover, as seen in FIG. 6C, Company 201 repays the debenture. Further, if share price is above strike, then put is not exercised. If share price is below, then Company 201 delivers shares to Counterparty 205 (e.g., pursuant to an effective registration) and Counterparty 205 pays consideration of cash and/or any of the debt of Company 201 (possibly including the debenture with Third party bank 203). Moreover, Counterparty 205 unwinds its hedge and delivers shares to the Lender 207 (from which Counterparty 205 had borrowed shares).

Reference will now be made to various illustrative Term Sheet examples relating to the alternative method of repurchasing issuer shares embodiment described above (of course, the examples of these Term Sheets are intended to be illustrative and not restrictive).

In any case, relating to the put option, example terms may be as follows:

| | |
|---|---|
| Buyer: | Company (the "Company"). |
| Seller: | Counterparty. |
| Shares: | Up to 2.72 million shares, in aggregate, of Company's common stock (assuming Initial Market Price of $36.750) to be executed in parts on several Initial Dates. |
| Initial Date: | Execution date of a Put Option transaction. |
| Initial Market Price: | Volume weighted 10b-18 average price for 3 trading days prior to an Initial Date. |
| Strike Price: | 100% of the Initial Market Price. |
| Notional Amount: | $100 million (assuming Initial Market Price of $36,750). |
| Term: | 5 Years. |
| Premium: | Buyer will pay quarterly premium at annual rate equal to 1.21% of the Notional Amount. |
| Dividends: | In the event of any change in Company's dividend rate, Premium shall be adjusted pursuant to a pre-determined formula designed to maintain Seller's and Buyer's economic position immediately prior to such change. |
| Early Expiration: | Company's common shares are economically unborrowable in the securities lending market or if share market price is less than $5.00 for 3 consecutive trading days. |
| Settlement: | If Buyer exercises this option, Buyer shall deliver Shares that are freely and immediately tradeable in the public market in the hands of the Seller and Seller will pay Buyer an amount of Consideration equal to the Notional Amount. Consideration shall be any combination (solely determined by Seller) of cash or Company's debt securities and obligations valued at its principal face amount (except in the case of zero coupon securities which would be valued based on accreted amount). |
| Documentation: | 1992 ISDA Agreement. |

Further, relating to the debenture, example terms may be as follows:

| | |
|---|---|
| Issuer: | Company (the "Company"). |
| Issue: | Junior Subordinated Notes (the "Notes") issued from time to time. |

-continued

| | |
|---|---|
| Principal Amount: | Up to $100 million in aggregate. |
| Issue Price: | 100 |
| Maturity: | 5 Years (or on any date Share Put Option Contract expires). |
| Coupon: | 7.48% payable quarterly (375 bps over 5-year Libor). |
| Ratings: | Issue would not be rated. |
| Use of Proceeds: | Refinance existing debt, repurchase common shares and other general corporate matters. |
| Rank: | Junior Subordinated Unsecured. |
| Default: | Any default under any material term of the Notes, the Share Put Option Contract, or with respect to any other agreements for borrowed money. Failure to pay any principal and interest when due with respect to agreements for borrowed money. Cross default and acceleration. Announcement or filing of Issuer's bankruptcy, insolvency or involuntary liquidation or reorganization. |
| Placement Agent: | Debenture privately placed to one or more accredited financial or investor institutions. |
| Placement Fee: | 0.50%. |

Further, relating to the share purchase, example terms may be as follows:

| | |
|---|---|
| Buyer: | Company (the "Company"). |
| Broker: | Counterparty |
| Shares: | Up to 2.72 million shares, in aggregate, of Company's common stock purchased from time to time. |
| Price per Share: | Volume weighted 10b-18 average price with respect to a purchase date. |
| Commission: | $0.020 per Share. |
| Documentation: | Ordinary brokerage account. |

Further, relating to the total return swap, example terms may be as follows:

| | |
|---|---|
| Fixed Payer: | Third Party Bank. |
| Floating Payer: | Counterparty. |
| Underlying Asset: | Debenture issued by Company (the "Company"). |
| Notional Amount: | $100 million. |
| Rate: | 3-Month Libor + X bps paid quarterly by Counterparty to Third Party Bank. |
| Maturity Date: | 5 years. |
| Fixed Amount: | Total return of the Debenture. |
| Pledge: | Third Party Bank shall pledge the Underlying Asset to Counterparty. |
| Documentation: | 1992 ISDA Agreement. |

Figure 7:
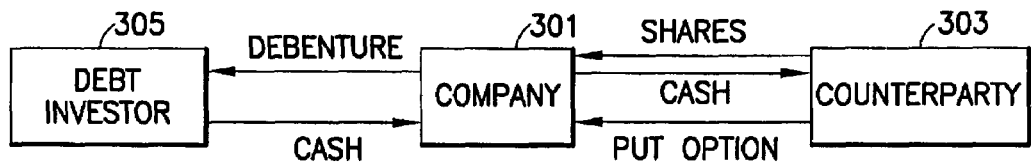
FIG. 7 shows another financing structure according to an embodiment of the present invention.

Referring now to FIG. 7, another embodiment of the invention will be described.

More particularly, as seen in this FIG. 7, Company 301 essentially simultaneously: (a) purchases its shares from Counterparty 303; and (b) purchases an "at-the-money" put option (and funds such purchase through issuance of a debenture with Debt Investor 305).

By operating as described, the Company fully benefits from any share appreciation. Further, in the event shares depreciate over the term, the Company effectively reverses its original purchase through exercise of its put option.

In one example (which example is intended to be illustrative and not restrictive), funding may be arranged through a private placement of the Company's debenture to one or more debt investors.

In another example (which example is intended to be illustrative and not restrictive), the income statement would reflect expense equal to debenture interest; balance sheet would reflect debenture principal amount; accounting for the "purchased" put option may be structured to meet either the equity or asset/liability classification of "EITF 0019."

In another example (which example is intended to be illustrative and not restrictive), the number of shares outstanding may be reduced by number of purchased shares.

In another example (which example is intended to be illustrative and not restrictive), the rating agencies may recognize substantial equity credit with respect to the put option (which should largely mitigate the increase in leverage resulting from the debenture.

In another example (which example is intended to be illustrative and not restrictive), there is Put/Call Parity: Call Option=Shares+Put Option−Debenture.

Of note, a company (such as a public company) may use the present invention to repurchase its own shares in a way that is more effective (e.g., cost, risk and accounting) compared to a traditional repurchase of shares or compared to the purchase of a traditional call option.

In this regard, the present invention may provide a way for a public company to repurchase shares such as: (a) traditional open market repurchase of issuer shares; (b) private repurchase of issuer shares; (c) synthetic repurchase of issuer shares (purchased call option, forward share purchase, and other similar instruments having embedded call options and forward purchases).

Further, the present invention may be used by a company for any application calling for it to repurchase shares (e.g., as described above) including, but not limited to, the following: (a) achieve a targeted debit/equity ratio; (b) reduce number of outstanding shares; (c) boost earnings per share; (c) hedge the dilution of an equity linked capital market instrument such as warrants, purchase rights, convertible debentures (including, but not limited to, mandatory convertibles, contingently convertibles and other varieties) or convertible preferred (including, but not limited to, mandatory convertibles, contingently convertibles and other varieties); (d) usage of excess cash; (e) make market to allow a large seller to sell (thereby avoiding a market disruption from oversupply); (e) signal management's view that its shares are undervalued.

Reference will now be made to viewing the present embodiment as a form of call option that a Company can buy on its own stock. As noted in Table 4, below, this alternative method of repurchasing issuer shares embodiment differs from a traditional call option in a number of ways (of course, the examples of this Table 4 are intended to be illustrative and not restrictive).

TABLE 4

(Embodiment of Present Invention vs. Traditional Call Option)

| | Embodiment of Present Invention | Traditional Call Option | |
|---|---|---|---|
| Participation in Share Price Upside | X | X | Under both, Company fully participates in any appreciation in the underlying shares. |

TABLE 4-continued (Embodiment of Present Invention vs. Traditional Call Option)

| | Embodiment of Present Invention | Traditional Call Option | |
|---|---|---|---|
| Avoidance of Share Price Downside | X | X | Under both, Company avoids any down side price risk of underlying shares (except for premium cost). |
| Balance Sheet Friendly | X | X | Under both, Company avoids having to use its liquidity to purchase shares outright. |
| Cash-Flow Friendly | X | — | Instead of one large premium payment, Company pays for Insurance through small periodic payments. |
| Tax Efficient | X | — | In contrast to a traditional call option, a significant portion of cost is tax deductible. |
| Reduction of Shares Outstanding | X | — | Unlike a traditional call option, shares underlying inventive structure reduces number used to calculate EPS. |

Reference will now be made to viewing the present embodiment as a way for a company to repurchase its shares without using its liquidity while also avoiding risk of any subsequent share price decline. As noted in Table 5 below, this alternative method of repurchasing issuer shares embodiment differs from a traditional share repurchase in a number of ways (of course, the examples of this Table 5 are intended to be illustrative and not restrictive).

Figure 8A:
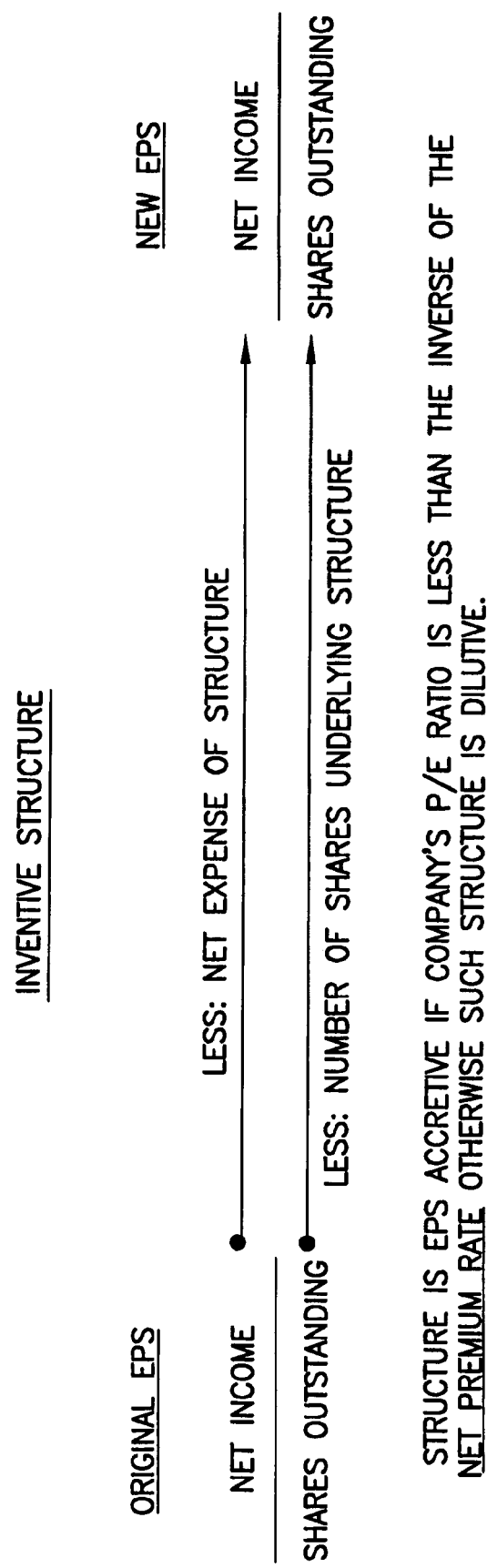
FIGS. 8A and 8B are diagrams relating to an effect on a company's earnings per share (FIG. 8A relates to funding according to an embodiment of the present invention and FIG. 8B relates to conventional share repurchase)
Figure 8B:
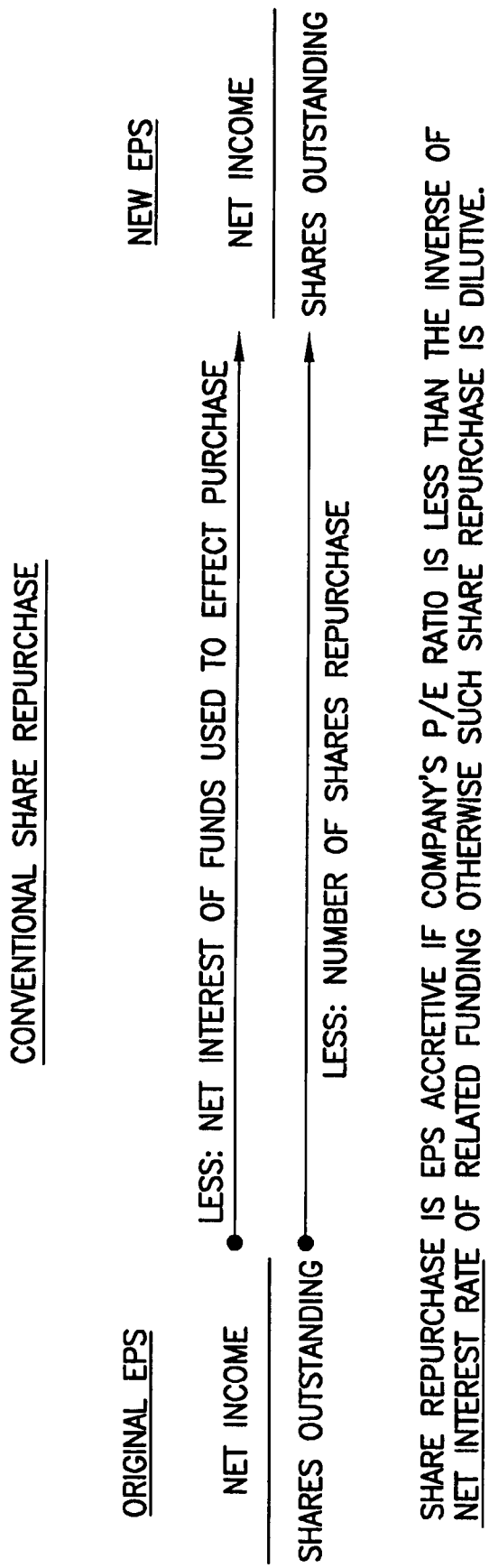

Referring now to FIGS. 8A and 8B, an effect on Company's Earnings per Share ("EPS") under the present embodiment and under a traditional share repurchase is shown (as seen in FIG. 8A; in the present embodiment the EPS is accretive if Company's P/E ratio is less than the inverse of the net premium rate otherwise such inventive structure is dilutive; as seen in FIG. 8B, in the conventional share repurchase the EPS is accretive if Company's P/E ratio is less than the inverse of

TABLE 5

(Embodiment of Present Invention vs. Traditional Share Repurchase)

| | Embodiment of Present Invention | Traditional Share Repurchase | |
|---|---|---|---|
| Participation in Share Price Upside | X | X | Under both, Company fully participates in any appreciation in the underlying shares. |
| Avoidance of Share Price Downside | X | — | Company avoids down side price risk of shares underlying inventive structure (except premium cost). |
| Balance Sheet Friendly | X | — | With inventive structure, Company avoids having to borrow (or use existing) cash to purchase shares. |
| Cash-Flow Friendly | X | — | Instead of one large premium payment at the onset, Company makes periodic payments over the term. |
| Tax Efficient | X | X | Similar to interest on share purchase borrowing, cost of inventive structure is largely tax deductible. |
| Reduction of Shares Outstanding | X | X | Similar to share purchase, shares underlying inventive structure reduces number used to calculate EPS. | net interest rate of related funding otherwise such share repurchase is dilutive).

Reference will now be made to Tables 6 and 7 showing various illustrative term examples relating to the alternative method of repurchasing issuer shares embodiment described above (of course, these examples are intended to be illustrative and not restrictive).

Figure 9:
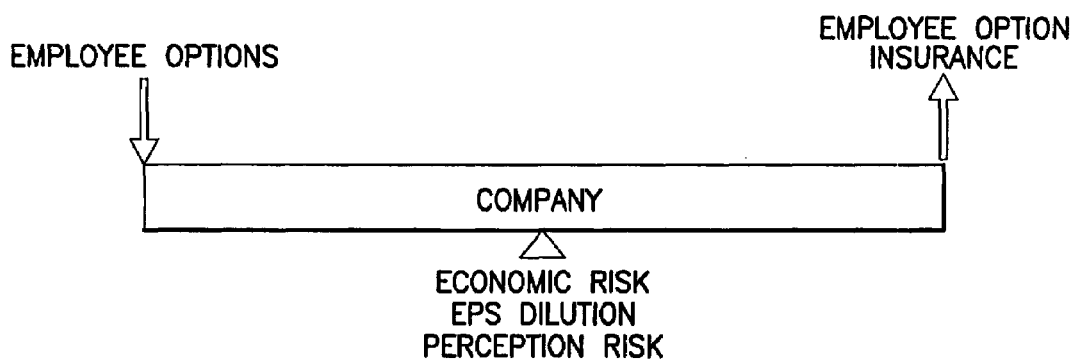
FIG. 9 is a diagram relating to mitigating effects of a company's employee options program according to an embodiment of the present invention.

Reference will now be made to viewing the present embodiment as a form of tax-efficient "Insurance" that a company can purchase to mitigate the adverse economic, accounting and perception effects of its employee option program (see FIG. 9). In this regard, it is noted that: (a) concerning Employee Option Insurance—this is a novel form of call option that a company can purchase on its own stock

TABLE 6

(Insurance company having an equity market cap of $8 billion and a P/E of 10.5)

| Company | Stock Price: | $ 36.75 | Marginal Tax Rate: | 40% |
| --- | --- | --- | --- | --- |
| | Shares Outstanding (mln): | 227.8 | Dividend Rate: | 3.16% |
| | Earnings per Share: | 3.493 | | |
| Employee Options | Number of Shares (mln): | 5.442 | Effective Assumed Term (yrs): | 5 |
| | Strike Price: | 100% | FAS 123 Volatility: | 23.5% |
| | Notional Amount ($mln): | $200.0 | FAS 123 Value: | 18.0% |
| EO Insurance | Num of Shares (mln): | 3.265 | Expense (after tax): | 4.49% |
| | Strike Price: | 100% | Net Effective Cost: | 2.54% |
| | Notional Amount: | $120.0 | Volatility: | 27.0% |

Net costs to purchase EO Insurance to fully mitigate risks is only 1.54% of amount of Employee Options issued.

| | | Prior Proforma | | Employee Option Unhedged[1] | | EO Insurance Only[2] | | Employee Option with EO Insurance[3] | |
| --- | --- | --- | --- | --- | --- | --- | --- | --- | --- |
| | | FY 2004 | | Change | Proforma | Change | Proforma | Change | Proforma |
| Earnings per Share | Net Income ($mlns) | $795.7 | | (4.320) | $791.4 | ($ 5.388) | $790.3 | ($ 9.708) | $786.0 |
| | Outstanding Shares (mlns) | 227.8 | | — | 227.8 | (3.265) | 224.5 | (3.265) | 224.53 |
| | Earnings per share | $ 3.493 | ($ 0.019) | | $ 3.474 | $ 0.027 | $ 3.520 | 0.008 | 3.501 |

[1] Assumes Employee Option expensed (as per FAS 123) equal to $36.0 mln (based on volatility of 24% and vesting period of 5.0 years) assuming 40.0% tax rate. Average prior period market price assumed equal or less than strike price of Employee Option.
[2] Illustrates isolated effect of purchasing EO insurance.
[3] Illustrates combined effect of Employee Option and EO Insurance.
Issuance of $200 mln of Employee Options would dilute EPS by $0.019 however purchase of $120 mln of EO Insurance would accrete EPS by $.027. Therefore net effect of issuance/purchase of such Employee Options/EO Insurance would be EPS accretive by $.008.

TABLE 7

(Electronics retailer having an equity market cap of $4.5 billion and a P/E of 17)

| Company | Stock Price: | $ 26.50 | Marginal Tax Rate: | 40% |
| --- | --- | --- | --- | --- |
| | Shares Outstanding (mln): | 168.41 | Dividend Rate: | 0.83% |
| | Earnings per Share: | 1.562 | | |
| Employee Options | Number of Shares (mln): | 7.547 | Effective Assumed Term (yrs): | 5 |
| | Strike Price: | 100% | FAS 123 Volatility: | 32.0% |
| | Notional Amount ($mln): | $2000 | FAS 123 Value: | 29.7% |
| EO Insurance | Num of Shares: | 4.528 | Expense (after tax): | 4.14% |
| | Strike Price: | 100% | Net Effective Cost: | 3.55% |
| | Notional Amount: | $ 120.0 | Volatility: | 39.0% |

Net costs to purchase EO Insurance to fully mitigate risks is only 2.13% of amount of Employee Options issued.

| | | Prior Pro forma | | Employee Option Unhedged[1] | | EO Insurance Only[2] | | Employee Option with EO Insurance[3] | |
| --- | --- | --- | --- | --- | --- | --- | --- | --- | --- |
| | | FY 2004 | | Change | Proforma | Change | Proforma | Change | Proforma |
| Earnings per Share | Net Income($mlns) | $263.1 | | ($7.128) | $255.9 | ($ 4.968) | $258.1 | ($12.096) | $251.0 |
| | Outstanding Shares (mlns) | 168.4 | | — | 168.4 | (4.528) | 163.9 | (4.528) | 163.88 |
| | Earnings per share | $ 1.562 | ($0.042) | | $ 1.520 | $ 0.013 | $ 1.575 | 0.031 | 1.531 |

[1] Assumes Employee Option expensed (as per FAS 123) equal to $59.4 mln (based on volatility of 32% and vesting period of 5.0 years) assuming 40.0% tax rate. Average prior period market price assumed equal or less than strike price of Employee Option.
[2] Illustrates isolated effect of purchasing EO insurance.
[3] Illustrates combined effect of Employee Option and EO Insurance.
Issuance of $200 mln of Employee Options would dilute EPS by $0.042 however purchase of $120 mln of EO Insurance would accrete EPS by $.013. Therefore net effect of issuance/purchase of such Employee Options/EO Insurance would be EPS dilutive by $.031.

that is specifically structured to mitigate the economic, accounting and perception risks related to employee option programs (as well as other equity-linked compensation); (b) Economic Risk—this may be mitigated because EO Insurance would pay company cash at the end of the term equal to the amount the employee option is in-the-money; (c) Accounting Dilution—this may be mitigated because Company receives a share reduction (for purposes of calculation of EPS) equal to the number of shares underlying the EO Insurance—therefore, in many cases, EPS dilution resulting from the issuance of Employee Options (even if such options are expensed) may be offset by the EPS accretion resulting from the EO Insurance; (c) Tax Efficiency—the insurance proceeds (if any) are believed to be received by Company tax-free—premiums paid by Company are largely tax-deductible.

Reference will now be made to the view that the risks associated with employee option programs are under intense scrutiny from investors and press as well as regulators and accounting professionals. In this regard, it is noted that: (a) in connection with Economic Risks—employee options are valuable and results in a wealth transference from shareholders to management—the ultimate cost to Company of Employee Options is difficult (if not impossible) to measure given the unpredictability of future share prices—it is difficult for management to "manage" what they cannot measure; (b) in connection with Accounting Impact—companies are under increasing pressure to voluntarily expense their Employee Options—mandatory expensing seems likely to occur—Employee Options average more than 2% of shares outstanding in a study of large companies (and significantly higher for tech companies); (c) in connection with Perception Risks—there is increasingly negative scrutiny of the costs of Employee Options—increasing amount of "double-guessing" of intentions of certain management actions intended to increase share price or increase earnings—management/shareholder alignment fostered by Employee Options can unravel if shares appreciate rapidly for reasons not attributed to management.

Reference will now be made to hedging risks of employee options, that is, what should companies do to mitigate the potential negative economic, accounting and perception risks of their employee option program? In this regard, the following possibilities are available: (a) Do Nothing—companies which do nothing to hedge their employee option programs assume all the related adverse economic, accounting and perception risks as previously described; (b) Purchase Shares—while effective in mitigating the economic risk of share price appreciation and accounting dilution, companies which purchase shares to hedge their Employee Option programs assume other risks such as: (i) economic downside risk of purchasing shares whose value declines (while Employee Option expires worthless); (ii) borrowing related to purchasing shares results in adverse cash flow, diminished liquidity, and ratings agency pressure; (iii) such share purchases often exasperates negative shareholder and press perceptions of management; (c) Purchase Traditional Call Option—companies rarely utilize traditional call options to hedge their Employee Options because: (i) traditional Call Options are expensive; (ii) there is no tax deduction for premium; (iii) there is no reduction in outstanding shares; (d) Purchase Employee Option Insurance according to an embodiment of the present invention; advantages include (but are not limited to): (i) wealth transference—the economic risk of share price appreciation (in excess of a fixed amount of premium) is borne by the insurance provider (and is not borne by shareholders); (ii) dilution mitigation—shares underlying Employee Option Insurance immediately reduce shares outstanding for purposes of calculation of Company's EPS; (iii) tax efficiency—net cost of Option Insurance is largely tax deductible; (iv) perception improvement—because wealth transference to management (in excess of premium) is paid by a third party insurer (and not shareholders), Employee Option Insurance results in better management/shareholder alignment of interests)—ability to measure cost results in improved program management; (v) compensation design—hedging the risks related to option programs may enable management to maintain/expand such programs in light of increased investor scrutiny—hedging share price risks could enable Company to retain stock price as the key compensation benchmark (instead of more complex formulas which some companies have implemented).

Figure 10:
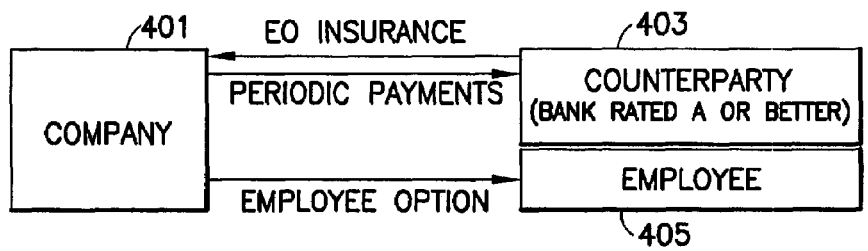
FIG. 10 shows another financing structure according to an embodiment of the present invention.

Referring now to FIG. 10, a diagram depicting the present embodiment of the invention will be shown. More particularly, as seen in this FIG. 10, Company 401 pays Counterparty 403 for Employee Option Insurance associated with Employee 405.

Reference will now be made to Table 8, below, referring to hedging risk of employee options (of course, the examples of this Table 8 are intended to be illustrative and not restrictive).

TABLE 8

(Hedging Risk Of Employee Options)

| | EO Insurance | Option Hedge | Share Hedge | No Hedge | |
|---|---|---|---|---|---|
| Mitigation of Share Price Upside Risk | X | X | X | — | EO Insurance essentially fully mitigates Company's economic exposure related to issuance of Employee Option. |
| Mitigation of Share Price Downside | X | X | — | X | Unlike a traditional purchase of hedge shares, EO Insurance has essentially no downside share price risk. |
| Balance Sheet Friendly | X | X | — | X | Borrowing funds for a traditional purchase of hedge shares may negatively impact Company's ratings. |
| Cash-Flow Friendly | X | — | — | X | Instead of one large premium payment at the onset, Company makes periodic payments over the term. |
| Tax Efficient | X | — | X | X | In contrast to a traditional option, |

TABLE 8-continued (Hedging Risk Of Employee Options)

| | EO Insurance | Option Hedge | Share Hedge | No Hedge | |
|---|---|---|---|---|---|
| | | | | | a significant portion of EO Insurance is tax deductible. |
| Mitigation of Earnings per Share | X | — | X | — | EO Insurance reduces number of shares used in the calculation of EPS which helps offset the dilution from the issuance of the employee option. |
| Cost Predictability | X | X | — | — | Costs of Employee Options hedged by EO Insurance are predictable which improves Company's ability to manage its programs. |

Reference will now be made to how EO Insurance of the present invention may be the best way for companies to hedge the risks of their employee option programs and may be the answer to the perception/accounting challenges currently facing management. In this regard, it is noted that: (a) in connection with economic risks—this embodiment mitigates economic risk of share price appreciation—does not introduce new risk of share price depreciation (similar to a share purchase)—premium is tax efficient—economic cost of hedged Employee Option program is measurable; (b) in connection with accounting impact—in this embodiment the shares underlying EO Insurance immediately reduce shares outstanding for purposes of calculation of Company's EPS—for many companies, the dilutive effect of their Employee Options (even if expensed under FAS 123) would be offset by the accretive effect of EO Insurance; (c) in connection with perception risks—wealth transference (in excess of premium) paid by a third party insurer results in better management/shareholder alignment of interests—ability to measure costs results in improved program management and perception—hedging risks may enable management to maintain or even expand its programs—hedging share price risks could enable Company to retain stock price as the key compensation benchmark (instead of more complex formulas).

In another embodiment of the present invention the following terms may apply: (a) Net Annual Rate—the after-tax net annual cost of the funding based on a marginal tax rate of X %; (b) Principal—the amount of funding received by Company to purchase a number of its shares at the original market price (e.g., may be defined as equal to the average execution price of the initial hedge which for purposes herein is assumed equal to $Y per share); (c) Number of Shares—the number of shares purchased at the original market price. Of note, under this embodiment the amount of Principal owed by Company at the end of the term would be equal to the lesser of the Principal or the then current market value of the Number of Shares.

In another embodiment of the present invention the inventive structure may be executed from time to time (e.g., in desired dollar value increments).

In another embodiment of the present invention one or more money center banks (e.g., rated A or higher) could be Counterparty to the Company in any transaction.

In another embodiment of the present invention the third party bank (or debt investor) may be rated A+ or better.

In another embodiment of the present invention the inventive structure may be executed straight-forwardly on company's balance sheet (e.g., without need to create any special purpose entities).

In another embodiment of the present invention the inventive structure may be executed from time to time (e.g., in smaller or larger sizes) in tandem with Company's issuance of Employee Options.

Of note, the embodiments described herein may, of course, be implemented using any appropriate computer hardware and/or computer software. In this regard, those of ordinary skill in the art are well versed in the type of computer hardware that may be used (e.g., a mainframe, a mini-computer, a personal computer ("PC"), a network (e.g., an intranet and/or the Internet)), the type of computer programming techniques that may be used (e.g., object oriented programming), and the type of computer programming languages that may be used (e.g., C++, Basic). The aforementioned examples are, of course, illustrative and not restrictive.

While a number of embodiments of the present invention have been described, it is understood that these embodiments are illustrative only, and not restrictive, and that many modifications may become apparent to those of ordinary skill in the art. For example, certain methods have been described herein as being "computer implemented". In this regard it is noted that while such methods can be implemented using a computer, the methods do not necessarily have to be implemented using a computer. Also, to the extent that such methods are implemented using a computer, not every step must necessarily be implemented using a computer. Further, the specific dates, time spans, rates, prices, values and the like described with reference to the various examples are, of course, illustrative and not restrictive. Further still, while the invention has been described herein principally in terms of a "structure," the invention is, of course, intended to encompass a "transaction". Further still, the term periodic could refer, for example, to daily, weekly, monthly, quarterly, semiannually, annually or at varying intervals. Further still, the various steps may be carried out in any desired order.

What is claimed is:

1. A method implemented by a programmed computer system for use in a financial transaction involving an entity which issues shares, an entity for providing funds and a counterparty, comprising:

obtaining, with the computer system, data regarding a debenture between the entity which issues shares and the entity for providing funds, wherein the debenture provides funds to the entity which issues shares;

obtaining, with the computer system, data regarding a purchase of shares by the entity which issues shares from the counterparty, wherein the counterparty borrows the purchased shares;

paying, by the entity which issues shares, for the purchase of shares, wherein the payment is made at least in part using at least a portion of the funds provided by the debenture;

obtaining, with the computer system, data regarding a share purchase contract between the entity which issues shares and the counterparty;

obtaining, with the computer system, data regarding a hedge of the share purchase contract by the counterparty;

obtaining, with the computer system, data regarding a total return swap of the debenture between the entity for providing funds and the counterparty;

periodically calculating, with the computer system, an amount of debenture interest owed by the entity which issues shares to the entity for providing funds;

periodically paying, by the entity which issues shares, the calculated amount of debenture interest;

periodically calculating, with the computer system, swap payments due under the total return swap;

periodically paying the calculated swap payments due under the total return swap;

periodically calculating, with the computer system, a share purchase contract premium owed by the entity which issues shares to the counterparty;

periodically paying, by the entity which issues shares, the calculated share purchase contract premium;

periodically calculating, with the computer system, hedge activity associated with the hedge of the share purchase contract;

periodically adjusting, with the computer system, the hedge based upon the calculated hedge activity;

obtaining, with the computer system, data regarding repayment of the debenture between the entity which issues shares and the entity for providing funds;

repaying, by the entity which issues shares, the debenture between the entity which issues shares and the entity for providing funds;

obtaining, with the computer system, data regarding the purchase of shares from the entity which issues shares by the counterparty under the share purchase contract;

calculating, with the computer system, a payment due under the share purchase contract for the purchase of shares from the entity which issues shares by the counterparty;

paying, by the counterparty, the calculated payment due under the share purchase contract;

calculating, with the computer system, hedge unwinding activity to unwind the hedge of the share purchase contract;

unwinding the hedge based upon the calculated hedge unwinding activity; and returning the shares borrowed by the counterparty.

2. The method of claim 1, wherein the funds provided by the debenture comprise cash.

3. The method of claim 1, wherein the counterparty hedges the share purchase contract as if the counterparty had sold a call option.

4. The method of claim 1, wherein the counterparty hedges the share purchase contract as if the counterparty had sold a call spread.

5. The method of claim 1, wherein the total return swap is prepaid.

6. The method of claim 1, wherein the calculated swap payments comprise a debenture return to be paid to the counterparty.

7. The method of claim 1, wherein the calculated swap payments comprise a London Interbank Offered Rate (LIBOR) debenture return to be paid to the entity for providing funds.

8. The method of claim 1, wherein the calculated payment due under the share purchase contract for the purchase of shares from the entity which issues shares by the counterparty is based at least in part upon a market price of the shares at the time of the settlement of the share purchase contract.

9. The method of claim 8, wherein the calculated payment due under the share purchase contract for the purchase of shares from the entity which issues shares by the counterparty is paid in consideration including at least one of: (a) cash; and (b) debt of the entity which issues shares.

10. The method of claim 9, wherein the debt comprises the debenture between the entity which issues shares and the entity for providing funds.

11. The method of claim 1, wherein the calculated payment due under the share purchase contract for the purchase of shares from the entity which issues shares by the counterparty comprises a net cash settlement.

12. The method of claim 1, wherein the shares purchased from the entity which issues shares by the counterparty under the share purchase contract are delivered pursuant to an effective registration statement.

* * * * *